United States Patent
Imada et al.

(10) Patent No.: US 7,073,076 B2
(45) Date of Patent: *Jul. 4, 2006

(54) CPU POWER ADJUSTMENT METHOD

(75) Inventors: Toyohisa Imada, Isehara (JP); Takuichi Hoshina, Hadano (JP)

(73) Assignee: Hitachi, Ltd., Tokyo (JP)

( * ) Notice: Subject to any disclaimer, the term of this patent is extended or adjusted under 35 U.S.C. 154(b) by 672 days.

This patent is subject to a terminal disclaimer.

(21) Appl. No.: 10/156,100

(22) Filed: May 29, 2002

(65) Prior Publication Data

US 2002/0138774 A1    Sep. 26, 2002

Related U.S. Application Data

(63) Continuation of application No. 09/228,296, filed on Jan. 8, 1999, now Pat. No. 6,408,393.

(30) Foreign Application Priority Data

Jan. 9, 1998    (JP)    ................... 10-002795

(51) Int. Cl.
*G06F 1/26* (2006.01)
(52) U.S. Cl. .................. 713/300; 713/323; 713/324; 713/330
(58) Field of Classification Search ............... 713/300, 713/323, 324, 330, 340; 709/223, 226; 711/163, 711/173, 203, 206; 712/13–14
See application file for complete search history.

(56) References Cited

U.S. PATENT DOCUMENTS

| | | | |
|---|---|---|---|
| 4,995,037 A | | 2/1991 | Imada et al. |
| 5,170,340 A | | 12/1992 | Prokop et al. |
| 5,390,334 A | * | 2/1995 | Harrison ..................... 713/324 |
| 5,579,524 A | | 11/1996 | Kikinis |
| 5,590,342 A | * | 12/1996 | Marisetty ..................... 713/324 |
| 5,845,138 A | * | 12/1998 | Nowlin, Jr. .................. 713/323 |
| 5,953,536 A | * | 9/1999 | Nowlin, Jr. .................. 713/323 |
| 6,055,640 A | * | 4/2000 | Kageshima et al. ........ 713/320 |
| 6,081,901 A | * | 6/2000 | Dewa et al. ................. 713/300 |
| 6,084,688 A | | 7/2000 | Stumbo et al. |
| 6,260,068 B1 | | 7/2001 | Zalewski et al. |
| 6,282,662 B1 | * | 8/2001 | Zeller et al. ................. 713/300 |
| 6,408,393 B1 | * | 6/2002 | Imada et al. ................. 713/300 |
| 6,446,213 B1 | * | 9/2002 | Yamaki ....................... 713/300 |
| 6,681,336 B1 | * | 1/2004 | Nakazato et al. ........... 713/322 |
| 6,848,054 B1 | * | 1/2005 | Watts, Jr. .................... 713/300 |
| 2004/0098630 A1 | * | 5/2004 | Masleid ...................... 713/320 |

FOREIGN PATENT DOCUMENTS

| | | |
|---|---|---|
| JP | 4-307631 | 10/1992 |
| JP | 4-346136 | 12/1992 |
| JP | 9-81401 | 3/1997 |

* cited by examiner

*Primary Examiner*—Ario Etienne
*Assistant Examiner*—Faruk Hamza
(74) *Attorney, Agent, or Firm*—Mattingly, Stanger, Malur & Brundidge, P.C.

(57) ABSTRACT

An adjustment method is able to effectively utilize a useless CPU power of a difference between a total CPU power required by a user and a CPU power of an installed computer. In a virtual machine system in which a plurality of virtual machines are operated on a physical machine, a total CPU power which results from totalizing CPU powers required by respective virtual machines is arbitrarily set within a CPU power of the physical machine, a CPU service rate is determined in such a manner that each virtual machine is operated within the thus set total CPU power and a CPU power of a difference between the CPU power of the physical machine and the total CPU power is assigned to a maintenance virtual machine.

2 Claims, 5 Drawing Sheets

FIG. 5
| LPAR TITLE | MAIN STORAGE | LOGICAL IP DEFINITION | USER-DEFINED SERVICE RATE | REAL SERVICE RATE |
|---|---|---|---|---|
| LPAR1 | m1 | LIP1,LIP2 | 60 | 48 |
| LPAR2 | m2 | LIP1,LIP2 | 40 | 32 |
|  |  |  |  |  |
| LPARX | mX | LIP1,LIP2 | — | 20 |
| 101 | 102 | 103 | 104 | 105 |
FIG. 6
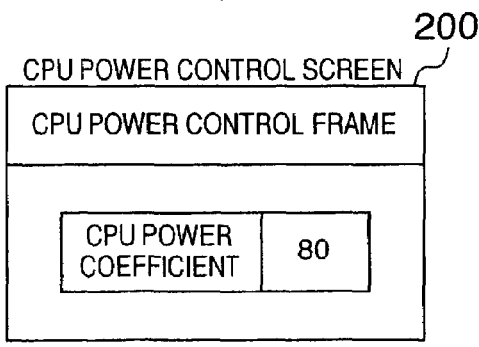
CPU POWER CONTROL SCREEN 200
| CPU POWER CONTROL FRAME | |
|---|---|
| CPU POWER COEFFICIENT | 80 |
FIG. 7
| CPU POWER COEFFICIENT | 80 |
|---|---|

FIG. 9

| CPU PROCESSING ITEM | CPU SERVICE RATE (%) ||
|---|---|---|
| | PRIOR ART | PRESENT INVENTION |
| LPAR1 | $\alpha 1$ | $\alpha 1$ |
| LPAR2 | $\alpha 2$ | $\alpha 2$ |
| EVENT SEARCH | $100 - \alpha 1 - \alpha 2$ | NEARLY ZERO |
| LPARX | — | $100 - \alpha 1 - \alpha 2$ |
| WHOLE SYSTEM | 100 | 100 | ns
CPU POWER ADJUSTMENT METHOD

This is a continuation application of U.S. Ser. No. 09/228,296, filed Jan. 8, 1999, now U.S. Pat. No. 6,408,393.

BACKGROUND OF THE INVENTION

The present invention relates to a method of effectively using a CPU (central processing unit) resource of a computer system, and particularly to a method of effectively utilizing a CPU resource which is useless in a virtual machine system.

When a computer user constructs a virtual machine system comprising a plurality of computers on an installed computer (physical machine), the computer user calculates a total CPU power by adding up a CPU power required by each virtual machine, and determines a product model which satisfies the total CPU power from product models that are set stepwise based on the magnitude of the CPU power. Then, the computer user designates a service ratio (service rate) in each virtual machine in response to the CPU power of the determined product model. JP-A-9-81401 describes a function to designate a service rate in each virtual machine.

That is, the total CPU power required by the user is smaller than the CPU power of the installed computer and a CPU power of such difference becomes useless.

SUMMARY OF THE INVENTION

It is an object of the present invention to provide a CPU power adjustment method in which the above-mentioned useless CPU power is assigned to a virtual machine which is operated as a monitoring or maintenance virtual machine on the whole system and may be effectively utilized for the operation management.

According to the present invention, in a virtual machine system in which a plurality of virtual machines are operated on a physical machine, the above-mentioned object may be achieved by arbitrarily setting a total CPU power which results from totalizing CPU powers required by each virtual machine within a CPU power of the physical machine, determining a CPU service rate in such a manner that each virtual machine is operated within the set total CPU power and assigning a CPU power of a difference between a CPU power of the physical machine and the total CPU power to a maintenance virtual machine.

Further, according to the present invention, in a virtual machine system in which a plurality of virtual machines are operated on a physical machine, the above-mentioned object may be achieved by totalizing CPU powers required by respective virtual machines, calculating a difference between a CPU power of said physical machine and said total CPU power, and generating a virtual having a CPU power of said difference.

BRIEF DESCRIPTION OF THE DRAWINGS

FIG. 5 is a diagram showing in detail an LPAR information table according to the present invention;

FIG. 6 is a diagram showing a CPU power control frame according to the present invention;

FIG. 7 is a diagram showing a CPU power designation table according to the present invention;

FIG. 9 is a table showing CPU service rates in the prior art and the present invention.

DESCRIPTION OF THE PREFERRED EMBODIMENT

An embodiment of the present invention will hereinafter be described in detail with reference to the drawings.

Figure 1:
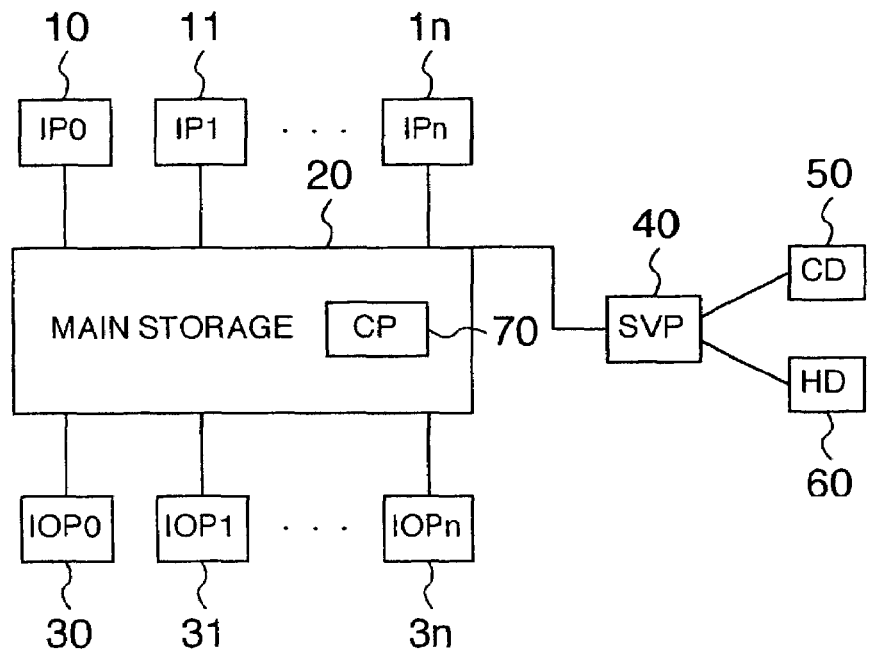
FIG. 1 is a block diagram showing a physical machine system to which the present invention is applied.

FIG. 1 of the accompanying drawings shows in block form a physical machine system to which the present invention is applied. In FIG. 1, reference numerals 10, 11, . . . , 1n denote a physical processor IP0, a physical processor IP1, . . . , a physical processor Ipn, respectively. Reference numeral 20 denotes a main storage. Reference numerals 30, 31, . . . , 3n denote an I/O processor IOP0, an I/O processor IOP1, . . . , an I/O processor IOPn, respectively. Reference numeral 40 denotes a service processor (SVP), reference numeral 50 denotes a console display apparatus (CD), and reference numeral 60 denotes a hard disk apparatus (HD), respectively. Reference numeral 70 denotes a control program (hereinafter referred to as "hyperviser") for controlling the whole system of a virtual machine system.

Figure 2:
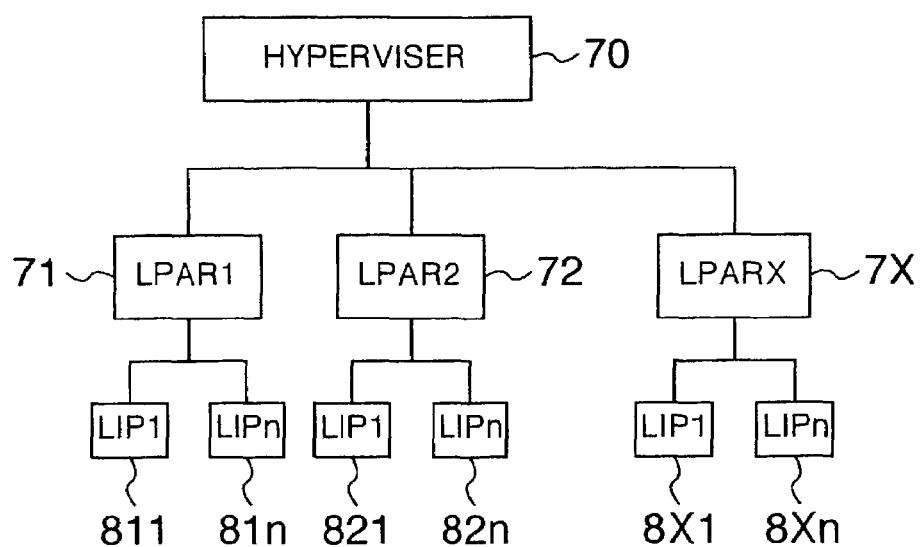
FIG. 2 is a block diagram showing a virtual machine system to which the present invention is applied.

FIG. 2 shows in block form a virtual machine system to which the present invention is applied. Reference numeral 70 denotes the hyperviser, 71, 72, 7X denote virtual machines (hereinafter referred to as "LPAR") LPAR1, LPAR2 and LPARX, respectively. The LAPR1 and the LAPR2 are virtual machines defined by the user, and the LPARX is a maintenance virtual machine which is newly provided according to the present invention. Reference numerals 811, . . . , 81n denote n logical processor (hereinafter referred to as "LIP") LIP1, . . . , LIPn which are operated under control of the LPAR1. Similarly, reference numerals 821, . . . , 82n denote n logical processors LIP1, . . . , LIPn which are operated under control of the LPAR2. Reference numerals 8X1, . . . , 8X2 denote n logical processors LIP1, . . . , LIPn which are operated under control of the LPARX. The hyperviser 70 exists within the main storage 20. While there are provided two virtual machines defined by the user in this embodiment, the number of the virtual machines is not limited to two and may be changed freely.

Figure 3:
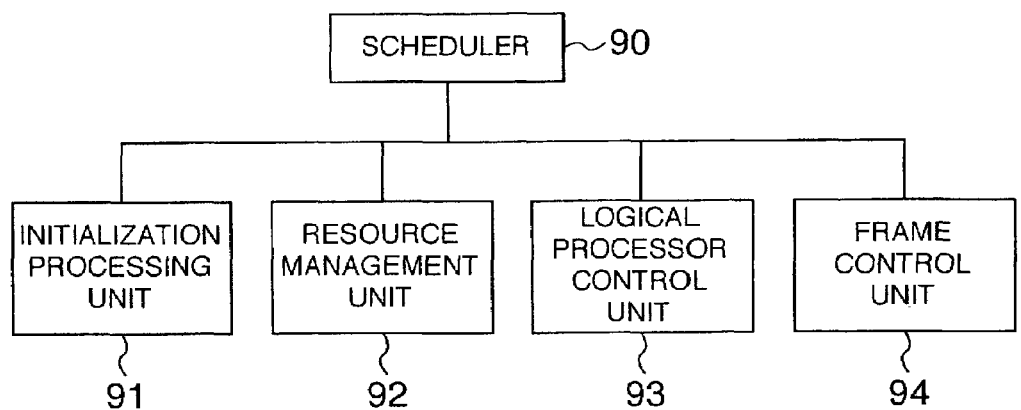
FIG. 3 is a block diagram showing a hyperviser according to the present invention.

FIG. 3 shows in block form the hyperviser 70. As shown in FIG. 3, the hyperviser 70 comprises a scheduler 90 for scheduling each LPAR, an initialization processing unit 91 for initializing each LPAR and activating the LPARX, a resource management unit 92 for managing a physical resource supplied from an SVP (service processor) and managing a logical resource of each LPAR, a logical processor control unit 93 for controlling the execution of the logical processor in each LPAR, a frame control unit 94 for controlling the state of displayed items such as the operating state of each LPAR.

Figure 4:
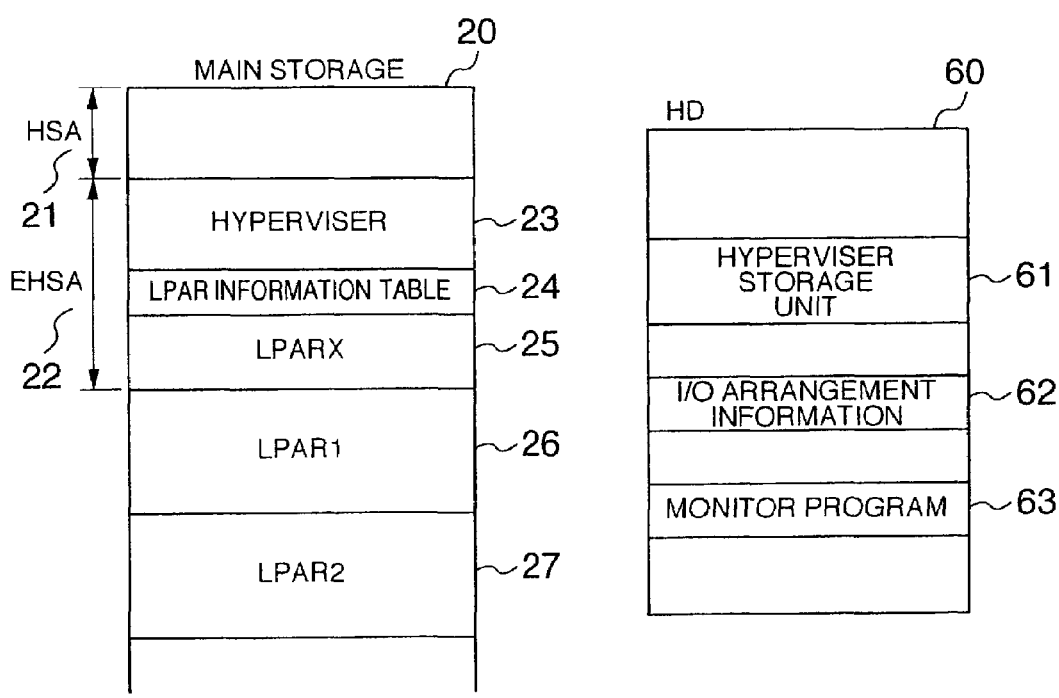
FIG. 4 is a diagram showing the state in which data are stored in a main storage and a hard disk apparatus according to the present invention.

FIG. 4 shows the manner in which data are stored in the main storage 20 and the hard disk HD 60. As shown in FIG. 4, the hard disk HD 60 comprises a hyperviser storage unit 61, an I/O arrangement information unit 62 and a monitor program storage unit 63. When the hyperviser 70 is activated, the hyperviser 70 stored in the hyperviser storage unit 61 is loaded in a corresponding unit (23) of an extended hardware system area (EHS) 22. The monitor program 63 for the LPARX stored in the monitor program storage unit 63 also is loaded onto a corresponding portion (24) of the extended hardware system area EHSA 22. In FIG. 4, reference numeral 21 denotes a hardware system area (HAS) in which hardware control information is stored when the computer is activated. Reference numeral 24 denotes a LPAR information table in which arrangement information of each LAPR is stored.

FIG. 5 shows a LPAR information table 100 in detail. In FIG. 5, reference numeral 101 denotes a LPAR title column. Reference numeral 102 denotes a main storage capacity setting column and which shows a main storage capacity given to each LAPR. Reference numeral 103 denotes a logical IP definition column and which shows a logical IP generated by each LPAR. Reference numeral 104 denotes a CPU service rate setting column of user definition. Reference numeral 105 denotes a CPU service rate (real service rate) which is assigned to each LPAR in actual practice.

FIG. 6 shows a CPU power control frame for SVP which is newly provided in the present invention. The CPU power control frame designates a CPU power necessary for the user by a coefficient obtained when the CPU power of the computer system installed by the user is set to 100. For example, the CPU power of the computer system is 100 MIPS, the CPU powers of the LPAR1 and LPAR2 of the virtual machine used by the user are respectively A1MIPS, A2MIPS and a total of A1 and A2 is 80 MIPS. In this case, the value 80 is designated as a CPU power coefficient. The CPU power coefficient designated by the CPU power control frame is stored in a CPU power designation table (FIG. 7), and managed by the resource management unit 92 of the hyperviser 70.

A CPU power control method according to this embodiment will be described next.

Initially, the physical machine is set in the virtual machine mode, and then the system is activated. When the system is activated, the hyperviser 70 is loaded from the hard disk apparatus (HD) to the extended hardware system area (EHSA) and then activated.

The hyperviser 70 prepares the maintenance LPAR (LAPRX) independently of the LPAR groups used by the user by an initialization processing, and automatically sets the LPARX main storage and the logical IP. When the CPU power coefficient is designated, a power (20 in the above-mentioned example) other than the designated CPU power is assigned to the LPARX to activate the LAPRX. Then, the LPAR1 and the LPAR2 are activated, and three LPARs are activated on the whole of the system. The CPU powers of the LPAR1 and the LPAR2 designate a rate value (real service rate) of the whole system in response to the above-mentioned necessary power values (A1, A2). The user designates only a rate value (user defined service rate) corresponding to the values (A1, A2) designated as the necessary CPU power.

The rate (service rate) in which the CPU power of the whole system is assigned to each LPAR will be described next concretely. In the prior art (when a CPU power designation function is not provided), with respect to the CPU powers A1, A2 required by each LPAR, when A1:A2=60:40, for example, the hyperviser 70 assigns 60% and 40% of the CPU power of the whole system to the LPAR1 and the LPAR2 in accordance with the setting of the LPAR frame. On the other hand, according to the present invention, 80% of the CPU power of the whole system is assigned to the LPAR1 and the LPAR2a and remaining 20% is assigned to the LPARX. Specifically, 48% (60%×0.8) of the CPU power of the whole system is assigned to the LPAR1, and 32% (40%×0.8) of the CPU power of the whole system is assigned to the LPAR2.

In order to prevent the CPU service rate of the user-defined LPAR from being fluctuated, LPAR must hold its CPU power constant (20% in this embodiment). To this end, a resource cap function (RC function) for guaranteeing the upper limit of the CPU service rate is set in the LPARX. The RC function is a function to suppress the CPU service from increasing more than the designated upper limit value of the CPU service rate. Further, there is set a wait completion function (WC function) for guaranteeing the lower limit of the CPU service rate. The WC function is a function of H/W to hold the control even when the program is placed in the WAIT state. Even when the frequency of WAIT is high, the WC function enables the CPU to be used up to the designated value of the CPU service rate. The RC function and the WC function are well-known functions and disclosed in JP-A-9-81401. As described above, by setting the RC function and the WC function, the LPARX may constantly hold a constant CPU service rate.

Figure 8:
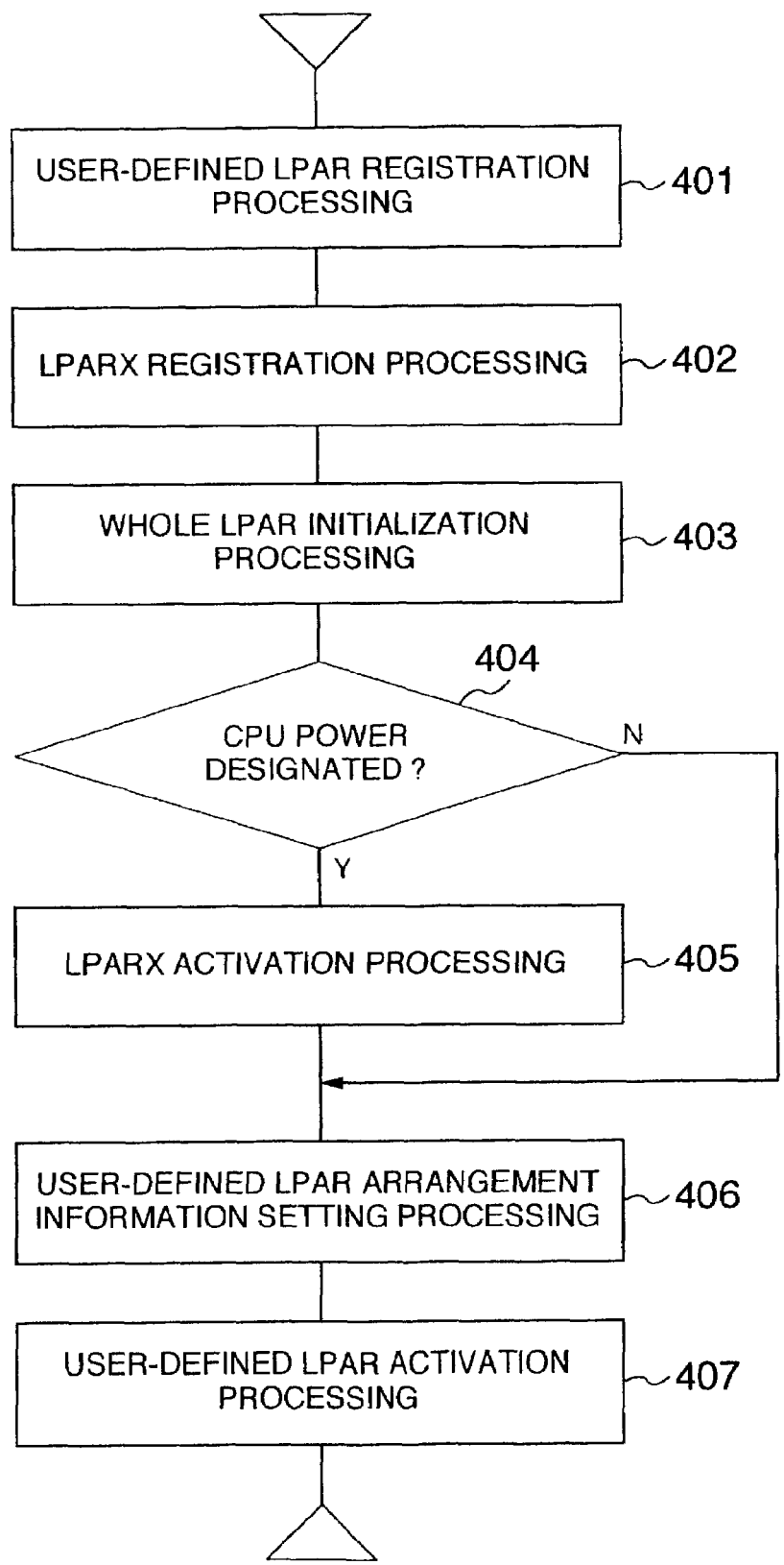
FIG. 8 is a flowchart showing an outline of a processing executed by a hyperviser according to the present invention.

Finally, the outline of the processing of the hyperviser will be described with reference to FIG. 8. FIG. 8 shows, of the hyperviser initialization processing, the procedure from the registration processing of the user-defined LPAR to the activation processing of the user-defined LAPR. In a user-defined LPAR registration processing 401, the designated LPAR title is retrieved from the I/O arrangement information 62 of the hard disk apparatus HD, and registered in the LPAR information table 100 managed by the hyperviser resource management unit. In a LPAR registration processing step 402, a LAPR, which is newly provided in the present invention, is registered under title of LPARX. Also, definition information of the main storage area and the logical IP assigned to the LPARX are registered in the LPAR information table 100. At that time, the logical IPs of the same number as that of the physical IPs are registered. This logical IP is set in the common mode (mode in which other LPAR and the physical IP are used in common). In a whole LPAR initialization processing step 403, the LPAR registered on the LPAR information table 100 is initialized. Specifically, the logical IP corresponding to each LPAR is generated and the internal table of the logical IP is initialized. In a CPU power designation and judgment step 404, a power designated value table 300 managed by the resource management unit 92 is read out. If the CPU power is designated (if the CPU power coefficient is not 100), then there is executed a LPARX activation processing step 405. If the CPU power is not designated (if the CPU power coefficient is 100), then the LPARX activation processing is not executed. In the LPARX activation processing step 405, there is executed an activate processing of LPARX. Specifically, this activate processing is a processing for making the main storage, the logical IP or the like assigned to the LPARX become on-line, and executes the on-line processing by using the arrangement information set in the LPARX information table 100. Thereafter, the monitor program is loaded in an automatic IPL (initial program load) fashion. In this manner, the hyperviser initialization processing is ended. Thereafter, in the LPAR frame, the arrangement information setting processing 406 of the user-defined LPAR becomes possible. After the arrangement was set, an activation processing 407 of user-defined LPAR is executed, and the CPU service rate based on the aforementioned CPU power coefficient is assigned. Thereafter, OS is loaded at very user-defined LPAR in an IPL fashion and the LPAR is operated in actual practice. Incidentally, the monitor program, which is being operated in the LPARX, is able to monitor the operating state of the user-defined LPAR in the LPAR frame.

When the CPU power coefficient is changed dynamically, the hyperviser reads out information of state change notice in response to such information supplied from the SVP, and changes the power designated value table 300 of the resource management unit 92. Thereafter, the hyperviser determines the assignment values on the whole system in a manner similar to the above-mentioned CPU assignment method, and determines a service rate of each LPAR. In order to dynamically change the CPU power coefficient, there is used an interface (external interrupt) for enabling the SVP to communicate with the hyperviser. That is, by adding the CPU power coefficient data read-in function to an HVA command for controlling the communication between the SVP and the hyperviser, upon interruption, the CPU power coefficient is communicated to the hyperviser. The processing for dynamically changing the CPU assignment value of each LPAR may be realized by using the LPAR frame.

FIG. 9 shows compared results of the CPU using rate (service rate) of the prior art and the CPU using rate (service rate) of the present invention. A study of FIG. 9 reveals that, according to the present invention, with respect to the LPAR1 and the LPAR2, CPU service rates $\alpha 1$, $\alpha 2$ corresponding to the necessary CPU powers A1, A2 are not changed. That is, in the prior art, CPU powers (100-$\alpha$1-$\alpha$2) other than the necessary CPU powers A1, A2 are used by the event search. However, according to the present invention, this CPU power (100-$\alpha$1-$\alpha$2) is assigned to the LPARX.

According to the present invention, since the user can use only the necessary CPU power, if the CPU power, which is not required by the user, is assigned to the maintenance virtual machine, then the operating state of the system may be managed. Hence, it is possible to effectively utilize the CPU resource.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A virtual machine system having an arrangement information table defining a plurality of virtual machines operated on a physical machine, comprising:
    a user-defined virtual machine defined in said arrangement information table; and
    a system-defined virtual machine defined in said arrangement information table, wherein said system-defined virtual machine is activated in accordance with a first CPU service rate, and wherein said user-defined virtual machine is activated in accordance with a second CPU service rate.

2. A virtual machine system having an arrangement information memory defining a plurality of virtual machines operated on a physical machine, comprising:
    a user-defined virtual machine defined in said arrangement information memory; and
    a system-defined virtual machine defined in said arrangement information memory, wherein said system-defined virtual machine is activated in accordance with a first CPU service rate, and wherein said user-defined virtual machine is activated in accordance with a second CPU service rate.

* * * * *